US012076280B2

(12) United States Patent
Valentino et al.

(10) Patent No.: US 12,076,280 B2
(45) Date of Patent: Sep. 3, 2024

(54) AUTOMATED SYSTEMS FOR POWERED COTS

(71) Applicant: Ferno-Washington, Inc., Wilmington, OH (US)

(72) Inventors: Nicholas V. Valentino, Wilmington, OH (US); Matthew Palastro, Wilmington, OH (US); Zhen Y. Shen, Wilmington, OH (US); Timothy R. Wells, Wilmington, OH (US); Timothy Paul Schroeder, Wilmington, OH (US); Joshua James Markham, Wilmington, OH (US); Robert L. Potak, Wilmington, OH (US)

(73) Assignee: Ferno-Washington, INC., Wilmington, OH (US)

( * ) Notice: Subject to any disclaimer, the term of this patent is extended or adjusted under 35 U.S.C. 154(b) by 1233 days.

(21) Appl. No.: 16/723,137

(22) Filed: Dec. 20, 2019

(65) Prior Publication Data

US 2020/0129349 A1 Apr. 30, 2020

Related U.S. Application Data

(60) Continuation of application No. 14/979,748, filed on Dec. 28, 2015, now Pat. No. 10,512,570, which is a (Continued)

(51) Int. Cl.
*A61G 1/02* (2006.01)
*A61G 1/04* (2006.01)

(Continued)

(52) U.S. Cl.
CPC ......... *A61G 1/0262* (2013.01); *A61G 1/0212* (2013.01); *A61G 1/0237* (2013.01);

(Continued)

(58) Field of Classification Search
CPC ........ A61G 7/005; A61G 7/012; A61G 7/015; A61G 7/018; A61G 13/02; A61G 13/04;

(Continued)

(56) References Cited

U.S. PATENT DOCUMENTS 2,203,204 A 6/1940 Nicolai
2,204,205 A 6/1940 Bell (Continued)

FOREIGN PATENT DOCUMENTS

AU 353436 S 1/2014
AU 354706 S 4/2014

(Continued)

OTHER PUBLICATIONS

Google Search: "timing belt purpose of idler pulley", Dec. 8, 2016 (2 pages) http://www.repairpal.com/timing-belt-idler.

(Continued)

*Primary Examiner* — Robert G Santos
(74) *Attorney, Agent, or Firm* — Dinsmore & Shohl LLP

(57) ABSTRACT

A cot can include a support frame that extends between a front end and a back end. A front leg and a back leg can be slidingly coupled to the support frame. A front actuator can be coupled to the front leg and slide the front leg to retract and extend the front leg. A back actuator can be coupled to the back leg and slide the back leg to retract and extend the front leg. One or more processors can execute machine readable instructions to receive signals from one or more sensors indicative of the front end of the cot and the front leg. The one or more processors can actuate the back actuator to extend the back leg to raise the back end of the cot, when the front end of the cot is supported by a surface and the front leg is retracted a predetermined amount.

9 Claims, 7 Drawing Sheets

Related U.S. Application Data division of application No. 14/414,812, filed as application No. PCT/US2013/051271 on Jul. 19, 2013, now Pat. No. 9,248,062.

(60) Provisional application No. 61/673,971, filed on Jul. 20, 2012.

(51) Int. Cl.
*A61G 1/056* (2006.01)
*A61G 7/012* (2006.01)
*A61G 13/06* (2006.01)

(52) U.S. Cl.
CPC .............. *A61G 1/0256* (2013.01); *A61G 1/04* (2013.01); *A61G 1/0562* (2013.01); *A61G 1/0567* (2013.01); *A61G 7/012* (2013.01); *A61G 13/06* (2013.01); *A61G 2200/16* (2013.01); *A61G 2203/42* (2013.01); *A61G 2203/726* (2013.01)

(58) Field of Classification Search
CPC .......... A61G 13/06; A61G 13/08; A61G 1/02; A61G 1/0212; A61G 1/0237; A61G 1/0256; A61G 1/0262; A61G 1/04; A61G 1/056; A61G 1/0562; A61G 1/0565; A61G 1/0567; A61G 2200/16; A61G 2203/42; A61G 2203/726
USPC ........ 5/610, 611, 620, 600, 86.1, 11; 296/20
See application file for complete search history.

(56) References Cited

U.S. PATENT DOCUMENTS 2,278,749 A 4/1942 Todd
2,642,250 A 6/1953 Kasnowich
3,397,912 A 8/1968 Beaufort
3,544,163 A 12/1970 Krein
3,612,606 A 10/1971 Swenson
3,631,546 A 1/1972 Eliasson
3,752,527 A 8/1973 Ferneau et al.
3,759,565 A 9/1973 Ferneau
3,826,528 A 7/1974 East
3,880,770 A 4/1975 Chenot
3,951,452 A 4/1976 Harder, Jr.
4,037,871 A 7/1977 Bourgraf et al.
4,073,538 A 2/1978 Hunter
4,155,588 A 5/1979 Danziger et al.
4,186,905 A 2/1980 Brudy
4,225,183 A 9/1980 Hanagan et al.
4,270,798 A 6/1981 Harder
4,466,664 A 8/1984 Kondou
D289,992 S 5/1987 Schrager
4,682,810 A 7/1987 Zarka
4,745,647 A 5/1988 Goodwin
4,761,841 A 8/1988 Larsen
4,767,148 A 8/1988 Ferneau et al.
4,829,633 A 5/1989 Kassner
4,921,295 A 5/1990 Stollenwerk
5,015,024 A 5/1991 Bloemer
5,023,968 A 6/1991 Diehl et al.
5,039,118 A 8/1991 Huang
5,056,805 A 10/1991 Wang
5,062,179 A 11/1991 Huang
5,069,465 A 12/1991 Stryker et al.
5,084,922 A 2/1992 Louit
5,088,136 A 2/1992 Stryker et al.
5,168,601 A 12/1992 Liu
5,265,969 A 11/1993 Chuang
5,431,087 A 7/1995 Kambara
5,509,159 A 4/1996 Du-Bois
5,537,700 A 7/1996 Way et al.
5,586,346 A 12/1996 Stacy et al.
5,630,428 A 5/1997 Wallace
5,720,057 A 2/1998 Duncan
5,774,914 A 7/1998 Johnson et al.
5,839,136 A 11/1998 Vance et al.
5,867,911 A 2/1999 Yates et al.
5,971,091 A 10/1999 Kamen et al.
5,996,954 A 12/1999 Rosen et al.
6,311,952 B2 11/2001 Bainter
D454,319 S 3/2002 Ito
6,405,393 B2 6/2002 Megown
6,503,018 B2 1/2003 Hou et al.
6,550,801 B1 4/2003 Newhard
6,565,111 B2 5/2003 Ageneau
6,578,922 B2 6/2003 Khedira et al.
6,654,973 B2 12/2003 Van Den Heuvel et al.
6,735,794 B1 5/2004 Way et al.
6,752,462 B1 6/2004 Kain et al.
6,789,292 B2 9/2004 Oshima et al.
6,948,197 B1 9/2005 Chen
6,976,696 B2 12/2005 O'Krangley et al.
7,003,829 B2 2/2006 Choi et al.
7,013,510 B1 3/2006 Johnson
7,273,256 B2 9/2007 Jane Santamaria
7,278,338 B2 10/2007 Chen
7,389,552 B1 6/2008 Reed et al.
7,398,571 B2 7/2008 Souke et al.
7,424,758 B2 9/2008 Broadley et al.
7,426,970 B2 9/2008 Olsen
7,540,047 B2 6/2009 Lambarth
7,568,766 B2 8/2009 Chen et al.
7,617,569 B2 11/2009 Liao
7,621,003 B2 11/2009 Myers et al.
D606,910 S 12/2009 Malassigne et al.
7,631,373 B2 12/2009 Broadley et al.
7,631,575 B2 12/2009 Gard et al.
7,637,550 B2 12/2009 Menna
7,641,211 B2 1/2010 Ivanchenko
7,685,660 B2 3/2010 Chinn
7,694,368 B2 4/2010 Lewis, Jr.
7,841,611 B2 11/2010 Ivanchenko
7,857,393 B2 12/2010 Cebula et al.
7,941,881 B2 5/2011 Hayes et al.
7,996,939 B2 8/2011 Benedict et al.
8,051,513 B2 11/2011 Reed et al.
8,056,950 B2 11/2011 Souke et al.
8,100,307 B2 1/2012 Chinn et al.
8,239,983 B2 8/2012 Chinn
8,240,410 B2 8/2012 Heimbrock et al.
8,439,416 B2 5/2013 Lambarth et al.
8,459,679 B2 6/2013 Jessie, Jr.
RE44,884 E 5/2014 Ambarth
8,714,612 B2 5/2014 Chinn
8,898,862 B1 12/2014 McGrath
8,901,747 B2 12/2014 Miller et al.
9,021,634 B2 5/2015 Goto et al.
9,233,033 B2 1/2016 Valentino et al.
9,248,062 B2 2/2016 Valentino et al.
9,456,938 B2 10/2016 Blickensderfer et al.
9,510,982 B2 12/2016 Valentino et al.
9,655,798 B2 5/2017 Zerhusen et al.
9,789,020 B2 10/2017 Blickensderfer et al.
9,827,156 B2 11/2017 Zerhusen
9,999,555 B2 6/2018 Magill et al.
10,098,796 B2 10/2018 Valentino et al.
10,117,794 B2 11/2018 Bourgraf et al.
10,206,836 B2 2/2019 Zerhusen
10,391,013 B2 * 8/2019 Blickensderfer .... A61G 1/0567
10,512,570 B2 12/2019 Valentino
10,736,798 B2 * 8/2020 Valentino ............. A61G 1/0262
10,925,781 B2 * 2/2021 Bourgraf .............. A61G 1/0562
2002/0056162 A1 5/2002 Flynn et al.
2002/0174486 A1 11/2002 Heuvel et al.
2003/0025378 A1 2/2003 Lin
2003/0172459 A1 9/2003 Roussy
2004/0088792 A1 5/2004 O'Krangley et al.
2004/0111798 A1 6/2004 Matunaga et al.
2004/0133981 A1 7/2004 Walkingshaw
2005/0126835 A1 6/2005 Lenkman
2005/0283911 A1 12/2005 Roussy
2006/0017263 A1 1/2006 Chen et al.

(56) References Cited

U.S. PATENT DOCUMENTS

| | | | |
|---|---|---|---|
| 2006/0075558 | A1 | 4/2006 | Lambarth et al. |
| 2006/0082176 | A1 | 4/2006 | Broadley et al. |
| 2006/0096029 | A1 | 5/2006 | Osborne et al. |
| 2006/0195987 | A1 | 9/2006 | Walkingshaw |
| 2006/0225203 | A1 | 10/2006 | Hosoya et al. |
| 2006/0265807 | A1 | 11/2006 | Choy et al. |
| 2007/0000057 | A1 | 1/2007 | Ward |
| 2007/0165044 | A1 | 7/2007 | Wells et al. |
| 2007/0245496 | A1 | 10/2007 | Chinn |
| 2008/0028527 | A1 | 2/2008 | Lewis |
| 2008/0128571 | A1 | 6/2008 | Dostaler et al. |
| 2008/0211248 | A1 | 9/2008 | Lambarth |
| 2009/0031498 | A1 | 2/2009 | Girard et al. |
| 2009/0165207 | A1 | 7/2009 | Reed et al. |
| 2009/0165208 | A1 | 7/2009 | Reed et al. |
| 2009/0172883 | A1 | 7/2009 | Benedict et al. |
| 2009/0222988 | A1 | 9/2009 | Reed et al. |
| 2009/0313758 | A1 | 12/2009 | Menkedick et al. |
| 2010/0083442 | A1 | 4/2010 | Nash |
| 2010/0199430 | A1 | 8/2010 | Chinn |
| 2010/0306921 | A1 | 12/2010 | Kramer |
| 2011/0080016 | A1 | 4/2011 | Lambarth et al. |
| 2011/0087416 | A1 | 4/2011 | Patmore |
| 2011/0169653 | A1 | 7/2011 | Wang et al. |
| 2011/0260417 | A1 | 10/2011 | Bitzer et al. |
| 2011/0265262 | A1 | 11/2011 | Di Lauro et al. |
| 2011/0266821 | A1 | 11/2011 | Goto et al. |
| 2011/0277773 | A1 | 11/2011 | Sullivan et al. |
| 2012/0275896 | A1 | 11/2012 | Magill et al. |
| 2013/0168987 | A1 | 7/2013 | Valentino et al. |
| 2014/0059768 | A1 | 3/2014 | Lemire et al. |
| 2014/0197654 | A1 | 7/2014 | Valentino et al. |
| 2014/0259410 | A1 | 9/2014 | Zerhusen et al. |
| 2014/0276269 | A1 | 9/2014 | Illindala |
| 2014/0292529 | A1 | 10/2014 | Zerhusen |
| 2015/0216747 | A1 | 8/2015 | Valentino et al. |
| 2016/0000617 | A1 | 1/2016 | Magill et al. |
| 2016/0106605 | A1 | 4/2016 | Valentino et al. |
| 2016/0128880 | A1 | 5/2016 | Blickensderfer et al. |
| 2016/0374884 | A1 | 12/2016 | Blickensderfer et al. |
| 2017/0042749 | A1 | 2/2017 | Valentino et al. |
| 2017/0172819 | A1 | 6/2017 | Bourgraf et al. |
| 2017/0367915 | A1 | 12/2017 | Blickensderfer et al. |
| 2018/0049932 | A1 | 2/2018 | Zerhusen |
| 2019/0015270 | A1 | 1/2019 | Bourgraf et al. |
| 2019/0015271 | A1 | 1/2019 | Valentino et al. |
| 2020/0129349 | A1 * | 4/2020 | Valentino ............. A61G 1/0212 |

FOREIGN PATENT DOCUMENTS

| | | | | |
|---|---|---|---|---|
| CN | 201366023 | Y | 12/2009 | |
| CN | 102781392 | A | 11/2012 | |
| DE | 29721734 | U1 | 3/1998 | |
| EP | 1698314 | A1 | 9/2006 | |
| EP | 2347745 | A1 | 7/2011 | |
| EP | 2412355 | A1 | 2/2012 | |
| EP | 3721846 | B1 * | 3/2024 | ........... A61G 1/0212 |
| GB | 2351439 | A | 1/2001 | |
| JP | 01166903 | A | 6/1989 | |
| JP | 02011955 | A | 1/1990 | |
| JP | 02200262 | A | 8/1990 | |
| JP | 2001197962 | A | 7/2001 | |
| JP | 2002543927 | A | 12/2002 | |
| NL | 8901747 | A | 2/1991 | |
| WO | 0069386 | A2 | 11/2000 | |
| WO | 0170161 | A1 | 9/2001 | |
| WO | 2011088169 | A1 | 7/2011 | |

OTHER PUBLICATIONS

Timing Belt Idler, Dec. 8, 2016, from Repair Pal (5 pages) http://repairpal.com/timing-belt-idler.

Tensioner from Wikipedia, Dec. 8, 2016 (4 pages) https://en.wikipedia.org/wiki/Tensioner.

"Timing Belt Tensioner", Automotive Care Wayback Machine-Internet Archive: archived from Dec. 29, 2014 http://web.archive.org/web/20141229221712/http://www.automotivecare.com/y- our-engine-101/belts-and-tensioners/.

* cited by examiner

AUTOMATED SYSTEMS FOR POWERED COTS

CROSS-REFERENCE TO RELATED APPLICATIONS

This application is a continuation of U.S. patent application Ser. No. 14/979,748, filed Dec. 28, 2015, now U.S. Pat. No. 10,512,570, issued Dec. 24, 2019, which is a divisional of U.S. patent application Ser. No. 14/414,812, filed Jan. 14, 2015, now U.S. Pat. No. 9,248,062, issued Feb. 2, 2016, which is a 371 of International Application PCT/US2013/051271, filed Jul. 19, 2013, which claims the benefit of priority under 35 U.S.C. § 119 to U.S. Provisional Application Ser. No. 61/673,971 filed on Jul. 20, 2012.

BACKGROUND

The present disclosure is generally related to automated systems, and is specifically directed to automated systems for powered cots.

There are a variety of emergency cots in use today. Such emergency cots may be designed to transport and load bariatric patients into an ambulance.

For example, the PROFlexX® cot, by Ferno-Washington, Inc. of Wilmington, Ohio U.S.A., is a manually actuated cot that may provide stability and support for loads of about 700 pounds (about 317.5 kg). The PROFlexX® cot includes a patient support portion that is attached to a wheeled undercarriage. The wheeled under carriage includes an X-frame geometry that can be transitioned between nine selectable positions. One recognized advantage of such a cot design is that the X-frame provides minimal flex and a low center of gravity at all of the selectable positions. Another recognized advantage of such a cot design is that the selectable positions may provide better leverage for manually lifting and loading bariatric patients.

Another example of a cot designed for bariatric patients, is the POWERFlexx+ Powered Cot, by Ferno-Washington, Inc. The POWERFlexx+ Powered Cot includes a battery powered actuator that may provide sufficient power to lift loads of about 700 pounds (about 317.5 kg). One recognized advantage of such a cot design is that the cot may lift a bariatric patient up from a low position to a higher position, i.e., an operator may have reduced situations that require lifting the patient.

A further variety is a multipurpose roll-in emergency cot having a patient support stretcher that is removably attached to a wheeled undercarriage or transporter. The patient support stretcher, when removed for separate use from the transporter, may be shuttled around horizontally upon an included set of wheels. One recognized advantage of such a cot design is that the stretcher may be separately rolled into an emergency vehicle such as station wagons, vans, modular ambulances, aircrafts, or helicopters, where space and reducing weight is a premium.

Another advantage of such a cot design is that the separated stretcher may be more easily carried over uneven terrain and out of locations where it is impractical to use a complete cot to transfer a patient. Example of such cots can be found in U.S. Pat. Nos. 4,037,871, 4,921,295, and International Publication No. WO2001/070161.

Although the foregoing multipurpose roll-in emergency cots have been generally adequate for their intended purposes, they have not been satisfactory in all aspects. For example, the foregoing emergency cots are loaded into ambulances according to loading processes that require at least one operator to support the load of the cot for a portion of the respective loading process.

SUMMARY

The embodiments described herein are directed to automated systems for versatile multipurpose roll-in emergency cots which may provide improved management of the cot weight, improved balance, and/or easier loading at any cot height, while being rollable into various types of rescue vehicles, such as ambulances, vans, station wagons, aircrafts and helicopters.

According to one embodiment, a cot can include a support frame, a front leg, a back leg, a front actuator, a back actuator, and one of more processesors. The support frame can extend between a front end of the cot and a back end of the cot. The front leg and the back leg can be slidingly coupled to the support frame. The front actuator can be coupled to the front leg. The front actuator can slide the front leg along the support frame to retract and extend the front leg. The back actuator can be coupled to the back leg. The back actuator can slide the back leg along the support frame to retract and extend the front leg. The one or more processors can be communicatively coupled to the front actuator and the back actuator. The one or more processors execute machine readable instructions to receive signals from one or more sensors indicative of the front end of the cot and the front leg. The one or more processors can actuate the back actuator to extend the back leg to raise the back end of the cot, when the front end of the cot is supported by a surface and the front leg is retracted a predetermined amount.

In some embodiments, the one or more sensors can include a front angular sensor that measures a front angle between the front leg and the support frame. The front angular sensor can communicate a front angle signal to the one or more processors such that the front angle signal is correlated to the front angle. The one or more processors can execute machine readable instructions to determine that the front leg is retracted the predetermined amount based at least in part upon the front angle. Alternatively or additionally, the front angular sensor can be a potentiometer rotary sensor or a hall effect rotary sensor.

According to the embodiments described herein the one or more sensors can comprise a back angular sensor that measures a back angle between the back leg and the support frame. The back angular sensor can communicate a back angle signal to the one or more processors such that the back angle signal is correlated to the back angle. The back angular sensor can be a potentiometer rotary sensor or a hall effect rotary sensor. The one or more processors can execute machine readable instructions to determine a difference between the back angle and the front angle based at least in part upon the front angle signal and the back angle signal. Alternatively or additionally, the one or more processors can execute machine readable instructions to compare the difference between the back angle and the front angle to a predetermined angle delta. The back leg can be automatically extended, when the difference between the back angle and the front angle is greater than or equal to the predetermined angle delta.

The one or more sensors can comprise a distance sensor that measures a distance indicative of a position of the front leg, the back leg, or both with respect to the support frame. The distance sensor can communicate a distance signal to the one or more processors such that the distance signal is correlated to the distance. The one or more sensors can comprise a distance sensor that measures a distance indicative of a position the front end of the cot with respect to the surface and communicates a distance signal to the one or more processors such that the distance signal is correlated to the distance. The distance sensor can be coupled to the support frame or the back actuator. The distance sensor can be an ultrasonic sensor, a touch sensor, or a proximity sensor.

According to the embodiments described herein, the cot can include a front actuator sensor and a back actuator sensor. The front actuator sensor can be communicatively coupled to the one or more processors. The front actuator sensor can measure force applied to the front actuator and can communicate a front actuator force signal correlated to the force applied to the front actuator. The back actuator sensor can be communicatively coupled to the one or more processors. The back actuator sensor can measure force applied to the back actuator and can communicates a back actuator force signal correlated to the force applied to the back actuator. The one or more processors can execute machine readable instructions to determine that the front actuator force signal is indicative of tension and the back actuator force signal is indicative of compression. The back leg can be automatically extended, when the front actuator force signal is indicative of tension and the back actuator force signal is indicative of compression.

According to the embodiments described herein, the one or more processors can execute machine readable instructions to abort actuation of the back actuator if a position of the back leg with respect to the back end of the cot fails to change for a predetermined amount of time after the back actuator is actuated.

In another embodiment, the cot can include a support frame, a front leg, a back leg, a middle portion and a line indicator. The support frame can extend between a front end of the cot and a back end of the cot. The front leg and the back leg can be slidingly coupled to the support frame. The front leg and the back leg can retract and extend to facilitate loading or unloading from a support surface. The middle portion can be disposed between the front end of the cot and the back end of the cot. The line indicator can be coupled to the cot. The line indicator can project an optical line indicative of the middle portion of the cot. Alternatively or additionally, the optical line can be projected beneath or adjacent to the middle portion of the cot to a point offset from a side of the cot. Alternatively or additionally, the line indicator can include a laser, a light emitting diode, or a projector.

According to the embodiments described herein, an intermediate load wheel can be coupled to the front leg between a proximal end and a distal end of the front leg. The intermediate load wheel can be substantially aligned with the optical line during loading or unloading. Alternatively or additionally, the intermediate load wheel can be a fulcrum during loading or unloading. Alternatively or additionally, the intermediate load wheel can be located at a center of balance of the cot during the loading or unloading.

According to the embodiments described herein, one or more processors can be communicatively coupled to the line indicator. The one or more processors execute machine readable instructions to receive signals from one or more sensors indicative of the front end of the cot. The one or more processors execute machine readable instructions to cause the line indicator to project the optical line, when the front end of the cot is above the support surface.

According to the embodiments described herein, the cot can include a back actuator and a back actuator sensor. The back actuator can be coupled to the back leg. The back actuator can slide the back leg along the support frame to retract and extend the front leg. The back actuator sensor can be communicatively coupled to the one or more processors. The back actuator sensor can measure force applied to the back actuator and can communicate a back actuator force signal correlated to the force applied to the back actuator. The one or more processors can execute machine readable instructions to determine that the back actuator force signal is indicative of tension. The optical line can be projected, when the back actuator force signal is indicative of tension.

According to the embodiments described herein, the one or more sensors can include a distance sensor that measures a distance indicative of a position the front end of the cot with respect to the support surface. The distance sensor can communicate a distance signal to the one or more processors such that the distance signal is correlated to the distance. The one or more processors execute machine readable instructions to determine that the front end of the cot is above the support surface, when the distance is within a definable range. The distance sensor can be coupled to the back actuator or aligned with the intermediate load wheel. The distance sensor can be an ultrasonic sensor, a touch sensor, or a proximity sensor.

In yet another embodiment, a cot can include a support frame, a front leg, a back leg, an actuator, a drive light, one or more processors, and one or more operator controls. The support frame can extend between a front end of the cot and a back end of the cot. The front leg and the back leg can be slidingly coupled to the support frame. The actuator can be coupled to the front leg or the back leg. The actuator can slide the front leg or the back leg along the support frame to actuate the support frame. The drive light can be coupled to the actuator. The one or more processors can be communicatively coupled to the drive light. The one or more operator controls can be communicatively coupled to the one or more processors. The one or more processors can execute machine readable instructions to automatically cause the drive light to illuminate, when an input is received from the one or more operator controls. The actuator can actuate the front leg, and the drive light can illuminate an area in front of the front end of the cot. The actuator can actuate the back leg, and the drive light can illuminate an area behind the back end of the cot.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosures can be best understood when read in conjunction with the following drawings, where like structure is indicated with like reference numerals and in which.

Figure 1:
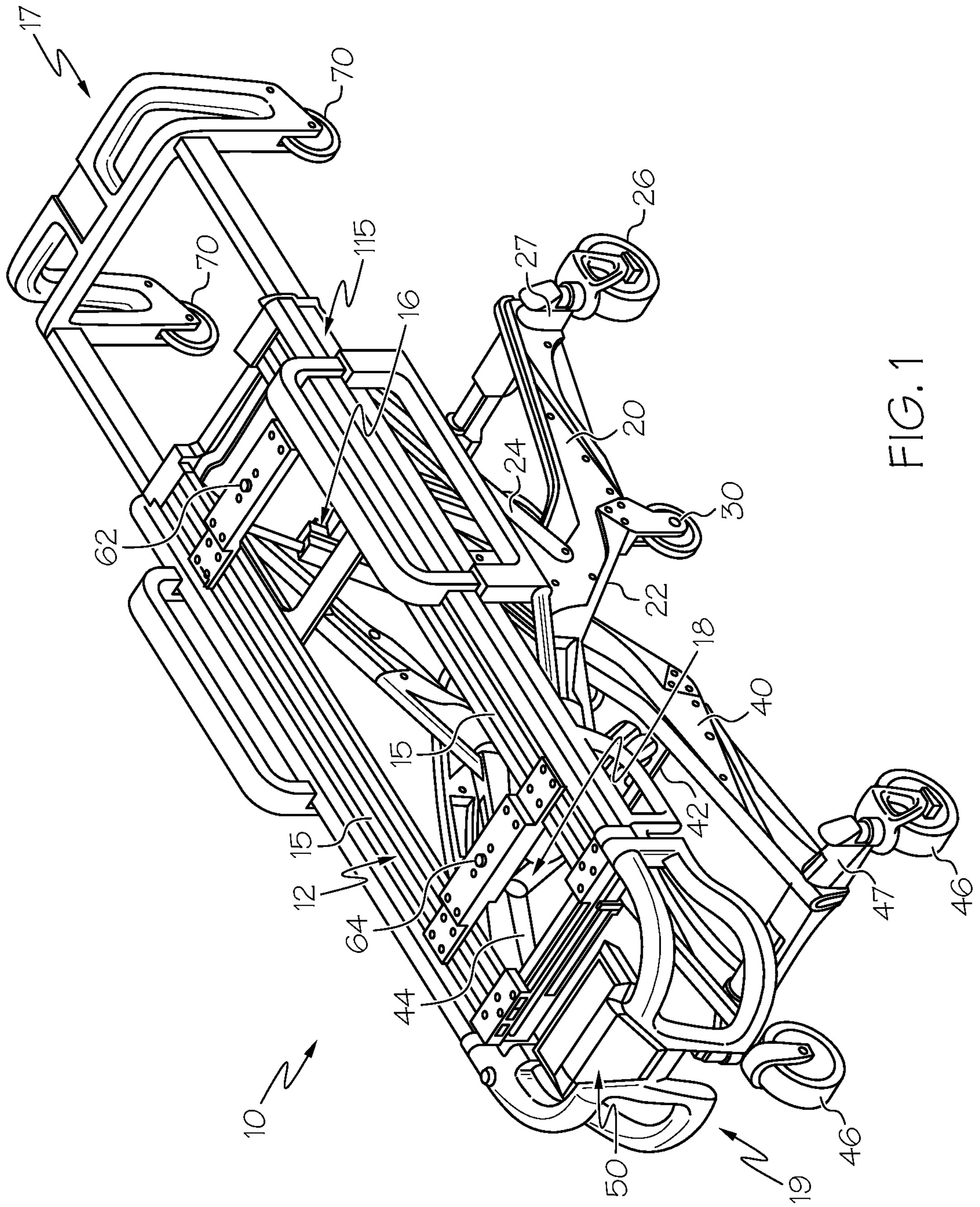
FIG. 1 is a perspective view depicting a cot according to one or more embodiments described herein.

The embodiments set forth in the drawings are illustrative in nature and not intended to be limiting of the embodiments described herein. Moreover, individual features of the drawings and embodiments will be more fully apparent and understood in view of the detailed description.

DETAILED DESCRIPTION

Referring to FIG. 1, a roll-in cot 10 for transport and loading is shown. The roll-in cot 10 comprises a support frame 12 comprising a front end 17, and a back end 19. As used herein, the front end 17 is synonymous with the loading end, i.e., the end of the roll-in cot 10 which is loaded first onto a loading surface. Conversely, as used herein, the back end 19 is the end of the roll-in cot 10 which is loaded last onto a loading surface. Additionally it is noted, that when the roll-in cot 10 is loaded with a patient, the head of the patient may be oriented nearest to the front end 17 and the feet of the patient may be oriented nearest to the back end 19. Thus, the phrase "head end" may be used interchangeably with the phrase "front end," and the phrase "foot end" may be used interchangeably with the phrase "back end." Furthermore, it is noted that the phrases "front end" and "back end" are interchangeable. Thus, while the phrases are used consistently throughout for clarity, the embodiments described herein may be reversed without departing from the scope of the present disclosure. Generally, as used herein, the term "patient" refers to any living thing or formerly living thing such as, for example, a human, an animal, a corpse and the like.

Figure 2:
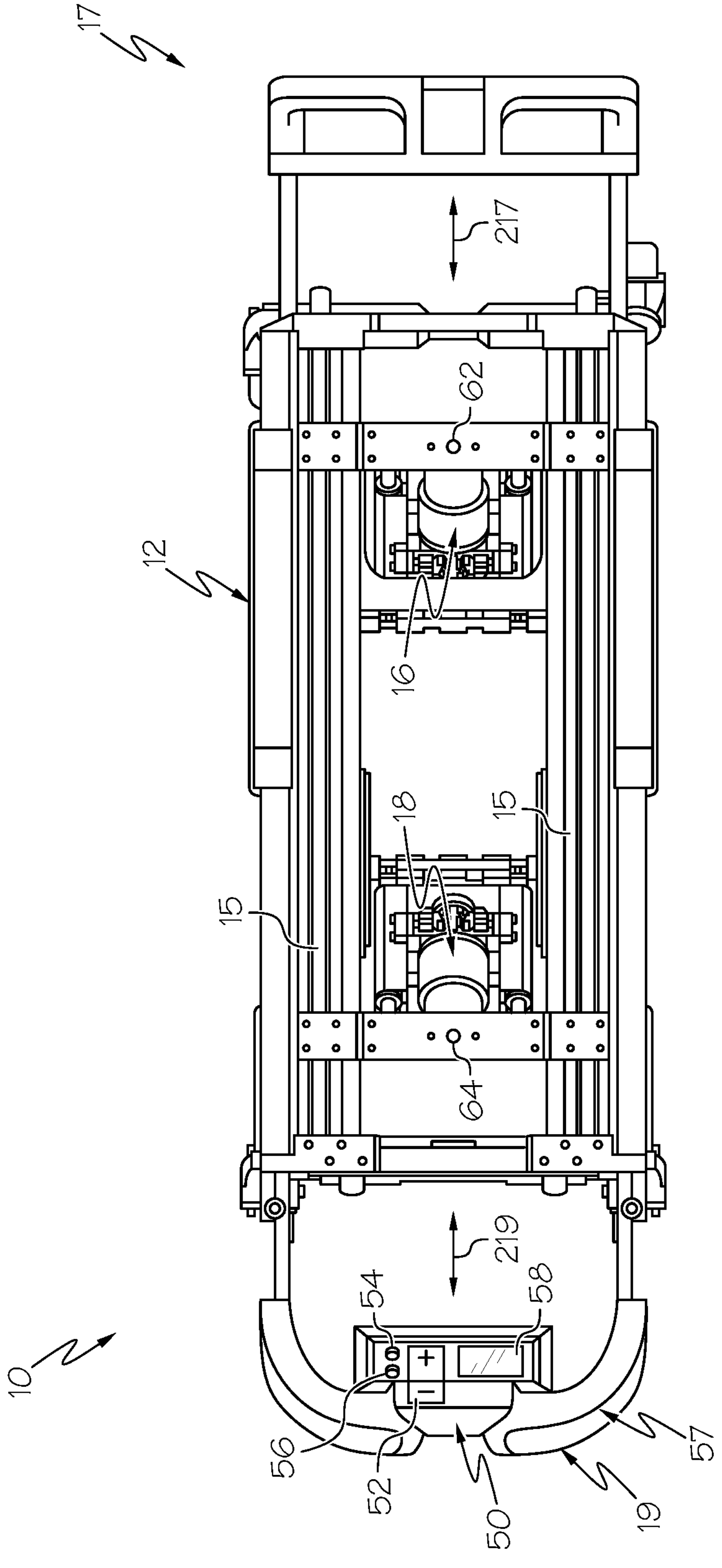
FIG. 2 is a top view depicting a cot according to one or more embodiments described herein.
Figure 3:
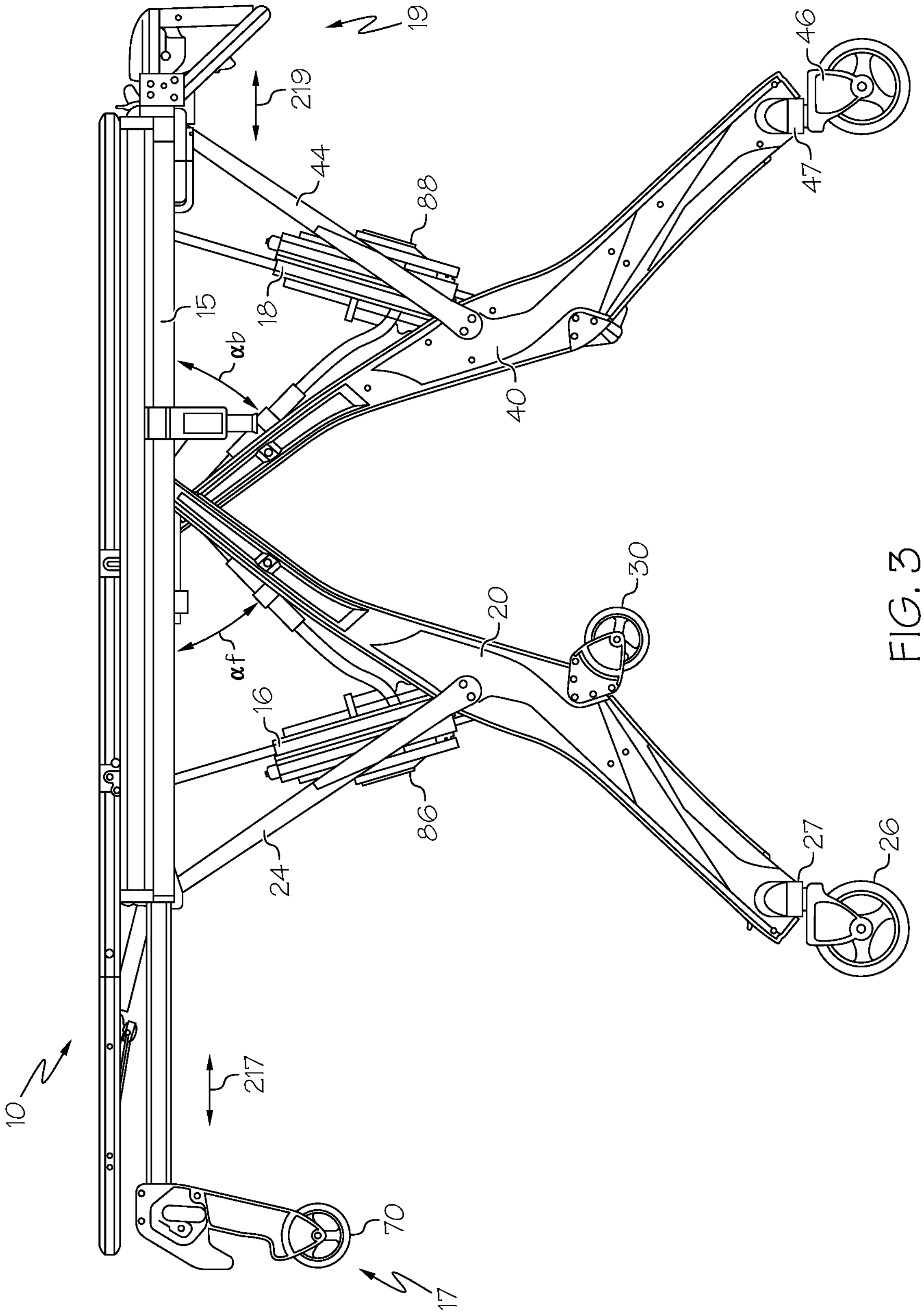
FIG. 3 is a side view depicting a cot according to one or more embodiments described herein.

Referring collectively to FIGS. 2 and 3, the front end 17 and/or the back end 19 may be telescoping. In one embodiment, the front end 17 may be extended and/or retracted (generally indicated in FIG. 2 by arrow 217). In another embodiment, the back end 19 may be extended and/or retracted (generally indicated in FIG. 2 by arrow 219). Thus, the total length between the front end 17 and the back end 19 may be increased and/or decreased to accommodate various sized patients.

Referring collectively to FIGS. 1-3, the support frame 12 may comprise a pair of substantially parallel lateral side members 15 extending between the front end 17 and the back end 19. Various structures for the lateral side members 15 are contemplated. In one embodiment, the lateral side members 15 may be a pair of spaced metal tracks. In another embodiment, the lateral side members 15 comprise an undercut portion that is engageable with an accessory clamp (not depicted). Such accessory clamps may be utilized to removably couple patient care accessories such as a pole for an IV drip to the undercut portion. The undercut portion may be provided along the entire length of the lateral side members to allow accessories to be removably clamped to many different locations on the roll-in cot 10.

Referring again to FIG. 1, the roll-in cot 10 also comprises a pair of retractable and extendible front legs 20 coupled to the support frame 12, and a pair of retractable and extendible back legs 40 coupled to the support frame 12. The roll-in cot 10 may comprise any rigid material such as, for example, metal structures or composite structures. Specifically, the support frame 12, the front legs 20, the back legs 40, or combinations thereof may comprise a carbon fiber and resin structure. As is described in greater detail herein, the roll-in cot 10 may be raised to multiple heights by extending the front legs 20 and/or the back legs 40, or the roll-in cot 10 may be lowered to multiple heights by retracting the front legs 20 and/or the back legs 40. It is noted that terms such as "raise," "lower," "above," "below," and "height" are used herein to indicate the distance relationship between objects measured along a line parallel to gravity using a reference (e.g. a surface supporting the cot).

In specific embodiments, the front legs 20 and the back legs 40 may each be coupled to the lateral side members 15. As shown in FIGS. 4A-5E, the front legs 20 and the back legs 40 may cross each other, when viewing the cot from a side, specifically at respective locations where the front legs 20 and the back legs 40 are coupled to the support frame 12 (e.g., the lateral side members 15 (FIGS. 1-3)). As shown in the embodiment of FIG. 1, the back legs 40 may be disposed inwardly of the front legs 20, i.e., the front legs 20 may be spaced further apart from one another than the back legs 40 are spaced from one another such that the back legs 40 are each located between the front legs 20. Additionally, the front legs 20 and the back legs 40 may comprise front wheels 26 and back wheels 46 which enable the roll-in cot 10 to roll.

In one embodiment, the front wheels 26 and back wheels 46 may be swivel caster wheels or swivel locked wheels. As the roll-in cot 10 is raised and/or lowered, the front wheels 26 and back wheels 46 may be synchronized to ensure that the plane of the lateral side members 15 of the roll-in cot 10 and the plane of the wheels 26, 46 are substantially parallel.

Referring again to FIGS. 1-3, the roll-in cot 10 may also comprise a cot actuation system comprising a front actuator 16 configured to move the front legs 20 and a back actuator 18 configured to move the back legs 40. The cot actuation system may comprise one unit (e.g., a centralized motor and pump) configured to control both the front actuator 16 and the back actuator 18. For example, the cot actuation system may comprise one housing with one motor capable to drive the front actuator 16, the back actuator 18, or both utilizing valves, control logic and the like. Alternatively, as depicted in FIG. 1, the cot actuation system may comprise separate units configured to control the front actuator 16 and the back actuator 18 individually. In this embodiment, the front actuator 16 and the back actuator 18 may each include separate housings with individual motors to drive each of the front actuator 16 and the back actuator 18.

The front actuator 16 is coupled to the support frame 12 and configured to actuate the front legs 20 and raise and/or lower the front end 17 of the roll-in cot 10. Additionally, the back actuator 18 is coupled to the support frame 12 and configured to actuate the back legs 40 and raise and/or lower the back end 19 of the roll-in cot 10. The roll-in cot 10 may be powered by any suitable power source. For example, the roll-in cot 10 may comprise a battery capable of supplying a voltage of, such as, about 24 V nominal or about 32 V nominal for its power source.

The front actuator 16 and the back actuator 18 are operable to actuate the front legs 20 and back legs 40, simultaneously or independently. As shown in FIGS. 4A-5E, simultaneous and/or independent actuation allows the roll-in cot 10 to be set to various heights. The actuators described herein may be capable of providing a dynamic force of about 350 pounds (about 158.8 kg) and a static force of about 500 pounds (about 226.8 kg). Furthermore, the front actuator 16 and the back actuator 18 may be operated by a centralized motor system or multiple independent motor systems.

In one embodiment, schematically depicted in FIGS. 1-3 and 6, the front actuator 16 and the back actuator 18 comprise hydraulic actuators for actuating the roll-in cot 10. In one embodiment, the front actuator 16 and the back actuator 18 are dual piggy back hydraulic actuators, i.e., the front actuator 16 and the back actuator 18 each forms a master-slave hydraulic circuit. The master-slave hydraulic circuit comprises four hydraulic cylinders with four extending rods that are piggy backed (i.e., mechanically coupled) to one another in pairs. Thus, the dual piggy back actuator comprises a first hydraulic cylinder with a first rod, a second hydraulic cylinder with a second rod, a third hydraulic cylinder with a third rod and a fourth hydraulic cylinder with a fourth rod. It is noted that, while the embodiments described herein make frequent reference to a master-slave system comprising four hydraulic cylinders, the master-salve hydraulic circuits described herein can include any even number of hydraulic cylinders.

Figure 6:
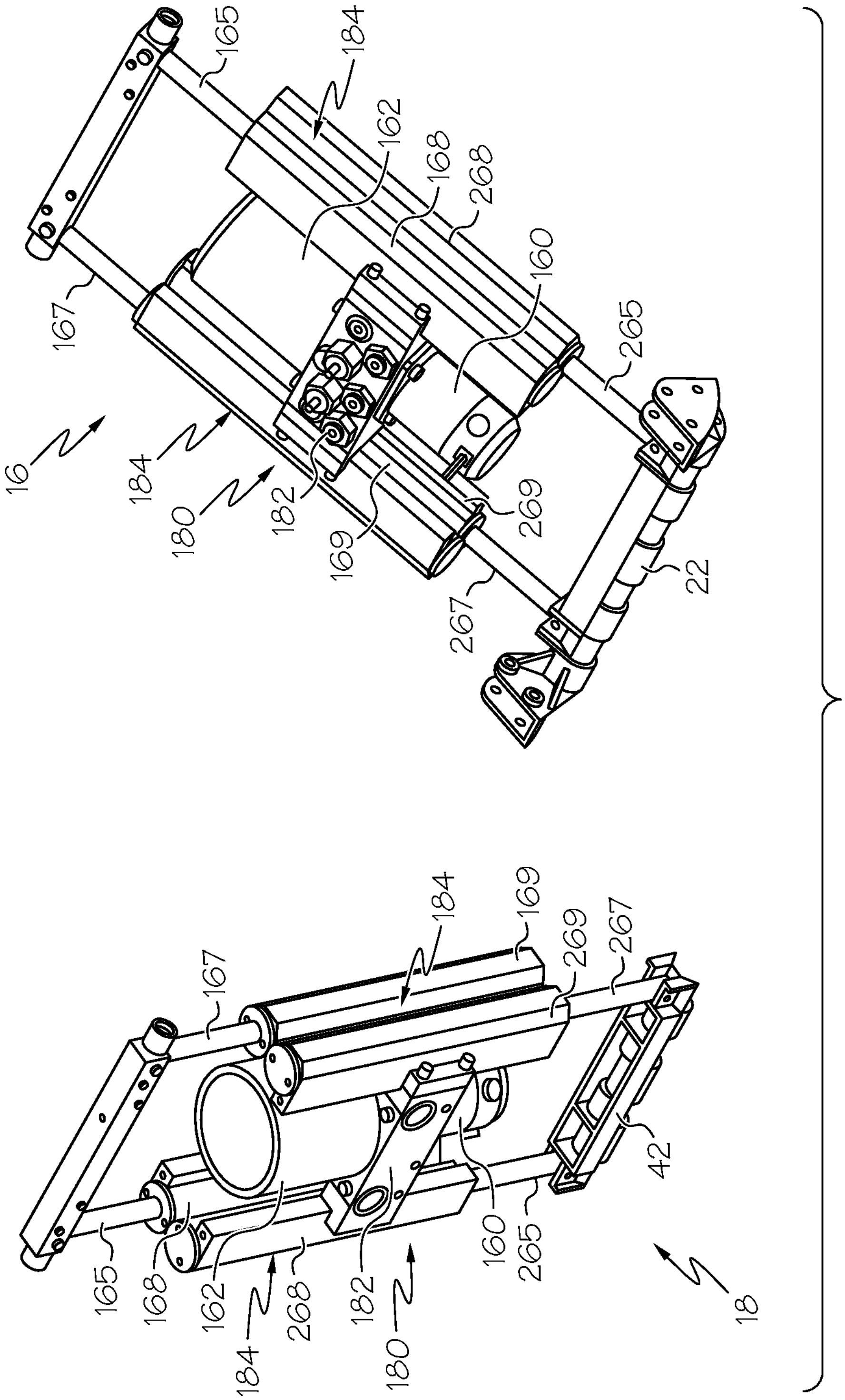
FIG. 6 schematically depicts an actuator system of a cot according to one or more embodiments described herein.

Referring to FIG. 6, the front actuator 16 and the back actuator 18 comprises a rigid support frame 180 that is substantially "H" shaped (i.e., two vertical portions connected by a cross portion). The rigid support frame 180 comprises a cross member 182 that is coupled to two vertical members 184 at about the middle of each of the two vertical members 184. A pump motor 160 and a fluid reservoir 162 are coupled to the cross member 182 and in fluid communication. In one embodiment, the pump motor 160 and the fluid reservoir 162 are disposed on opposite sides of the cross member 182 (e.g., the fluid reservoir 162 disposed above the pump motor 160). Specifically, the pump motor 160 may be a brushed bi-rotational electric motor with a peak output of about 1400 watts. The rigid support frame 180 may include additional cross members or a backing plate to provide further rigidity and resist twisting or lateral motion of the vertical members 184 with respect to the cross member 182 during actuation.

Each vertical member 184 comprises a pair of piggy backed hydraulic cylinders (i.e., a first hydraulic cylinder and a second hydraulic cylinder or a third hydraulic cylinder and a fourth hydraulic cylinder) wherein the first cylinder extends a rod in a first direction and the second cylinder extends a rod in a substantially opposite direction. When the cylinders are arranged in one master-slave configuration, one of the vertical members 184 comprises an upper master cylinder 168 and a lower master cylinder 268. The other of the vertical members 184 comprises an upper slave cylinder 169 and a lower slave cylinder 269. It is noted that, while master cylinders 168, 268 are piggy backed together and extend rods 165, 265 in substantially opposite directions, master cylinders 168, 268 may be located in alternate vertical members 184 and/or extend rods 165, 265 in substantially the same direction.

Figure 7:
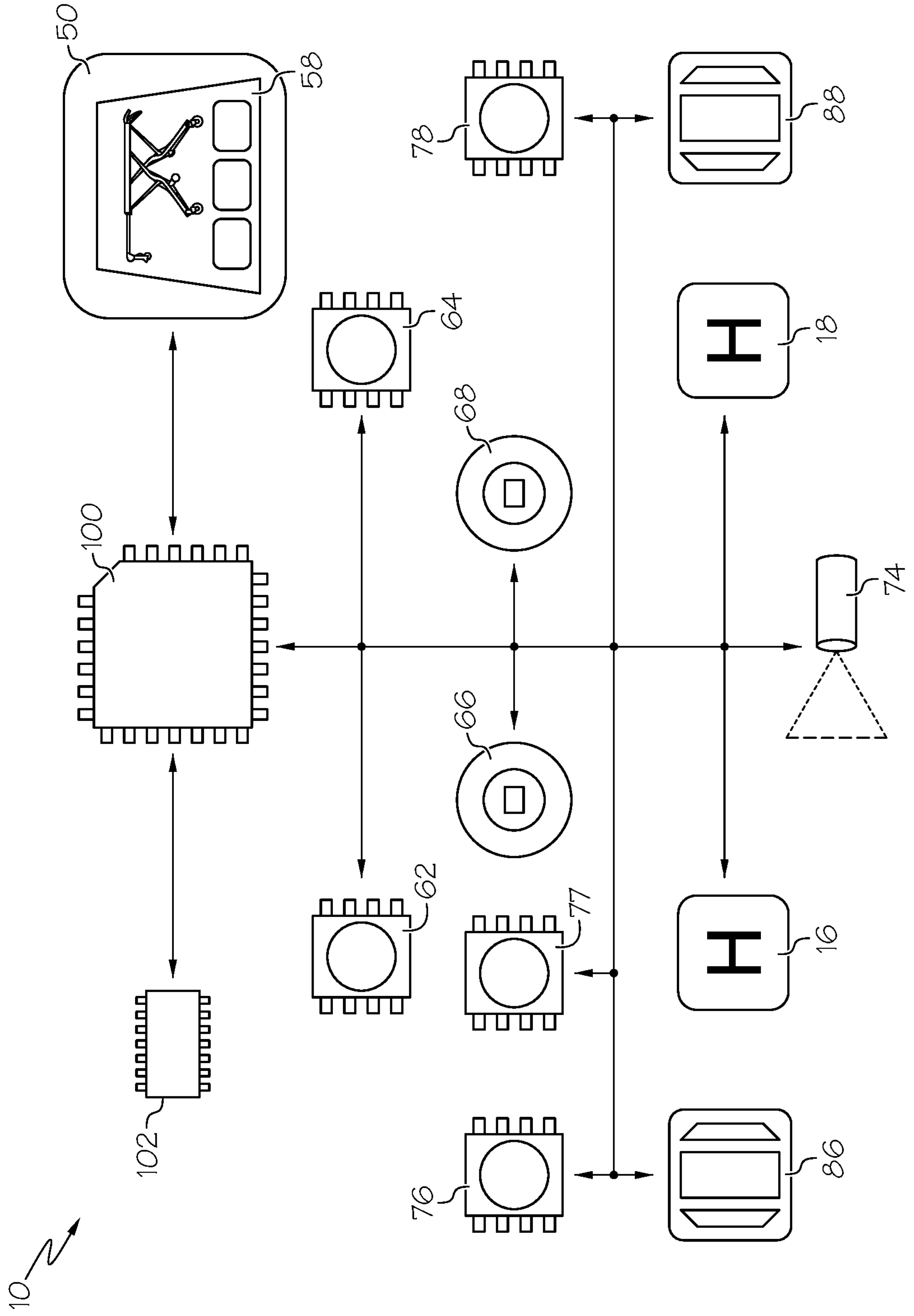
FIG. 7 schematically depicts a cot having an electrical system according to one or more embodiments described herein.

Referring now to FIG. 7, the control box 50 is communicatively coupled (generally indicated by the arrowed lines) to one or more processors 100. Each of the one or more processors can be any device capable of executing machine readable instructions such as, for example, a controller, an integrated circuit, a microchip, or the like. As used herein, the term "communicatively coupled" means that the components are capable of exchanging data signals with one another such as, for example, electrical signals via conductive medium, electromagnetic signals via air, optical signals via optical waveguides, and the like.

The one or more processors 100 can be communicatively coupled to one or more memory modules 102, which can be any device capable of storing machine readable instructions. The one or more memory modules 102 can include any type of memory such as, for example, read only memory (ROM), random access memory (RAM), secondary memory (e.g., hard drive), or combinations thereof. Suitable examples of ROM include, but are not limited to, programmable read-only memory (PROM), erasable programmable read-only memory (EPROM), electrically erasable programmable read-only memory (EEPROM), electrically alterable read-only memory (EAROM), flash memory, or combinations thereof. Suitable examples of RAM include, but are not limited to, static RAM (SRAM) or dynamic RAM (DRAM).

The embodiments described herein can perform methods automatically by executing machine readable instructions with the one or more processors 100. The machine readable instructions can comprise logic or algorithm(s) written in any programming language of any generation (e.g., 1 GL, 2 GL, 3 GL, 4 GL, or 5 GL) such as, for example, machine language that may be directly executed by the processor, or assembly language, object-oriented programming (OOP), scripting languages, microcode, etc., that may be compiled or assembled into machine readable instructions and stored. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring collectively to FIGS. 2 and 7, a front actuator sensor 62 and a back actuator sensor 64 configured to detect whether the front and back actuators 16, 18 respectively are under tension or compression can be communicatively coupled to the one or more processors 100. As used herein, the term "tension" means that a pulling force is being detected by the sensor. Such a pulling force is generally associated with the load being removed from the legs coupled to the actuator, i.e., the leg and or wheels are being suspended from the support frame 12 without making contact with a surface beneath the support frame 12. Furthermore, as used herein the term "compression" means that a pushing force is being detected by the sensor. Such a pushing force is generally associated with a load being applied to the legs coupled to the actuator, i.e., the leg and or wheels are in contact with a surface beneath the support frame 12 and transfer a compressive strain on the coupled actuator.

In one embodiment, the front actuator sensor 62 and the back actuator sensor 64 are coupled to the support frame 12; however, other locations or configurations are contemplated herein. The sensors may be proximity sensors, strain gauges, load cells, hall-effect sensors, or any other suitable sensor operable to detect when the front actuator 16 and/or back actuator 18 are under tension or compression. In further embodiments, the front actuator sensor 62 and the back actuator sensor 64 may be operable to detect the weight of a patient disposed on the roll-in cot 10 (e.g., when strain gauges are utilized). It is noted that the term "sensor," as used herein, means a device that measures a physical quantity and converts it into a signal which is correlated to the measured value of the physical quantity. Furthermore, the term "signal" means an electrical, magnetic or optical waveform, such as current, voltage, flux, DC, AC, sinusoidal-wave, triangular-wave, square-wave, and the like, capable of being transmitted from one location to another.

Referring collectively to FIGS. 3 and 7, the roll-in cot 10 can comprise a front angular sensor 66 and a back angular sensor 68 that are communicatively coupled to the one or more processors 100. The front angular sensor 66 and the back angular sensor 68 can be any sensor that measures actual angle or change in angle such as, for example, a potentiometer rotary sensor, hall effect rotary sensor and the like. The front angular sensor 66 can be operable to detect a front angle $\alpha_f$ of a pivotingly coupled portion of the front legs 20. The back angular sensor 68 can be operable to detect a back angle $\alpha_b$ of a pivotingly coupled portion of the back legs 40. In one embodiment, front angular sensor 66 and back angular sensor 68 are operably coupled to the front legs 20 and the back legs 40, respectively. Accordingly, the one or more processors 100 can execute machine readable instructions to determine the difference between the back angle $\alpha_b$ and the front angle $\alpha_f$ (angle delta). A loading state angle may be set to an angle such as about 20° or any other angle that generally indicates that the roll-in cot 10 is in a loading state (indicative of loading and/or unloading). Thus, when the angle delta exceeds the loading state angle the roll-in cot 10 may detect that it is in a loading state and perform certain actions dependent upon being in the loading state. Alternatively, distance sensors can be utilized to perform measurements analogous to angular measurements that determine the front angle $\alpha_f$ and back angle $\alpha_b$. For example, the angle can be determined from the positioning of the front legs 20 and/or the back legs 40 and relative to the lateral side members 15. For example, the distance between the front legs 20 and a reference point along the lateral side members 15 can be measured. Similarly, the distance between the back legs 40 and a reference point along the lateral side members 15 can be measured. Moreover, the distance that the front actuator 16 and the back actuator 18 are extended can be measured. Accordingly, any of the distance measurements or angular measurements described herein can be utilized interchangeably to determine the positioning of the components of the roll-in cot 10.

Additionally, it is noted that distance sensors may be coupled to any portion of the roll-in cot 10 such that the distance between a lower surface and components such as, for example, the front end 17, the back end 19, the front load wheels 70, the front wheels 26, the intermediate load wheels 30, the back wheels 46, the front actuator 16 or the back actuator 18 may be determined Referring collectively to FIGS. 3 and 7, the front end 17 may comprise a pair of front load wheels 70 configured to assist in loading the roll-in cot 10 onto a loading surface (e.g., the floor of an ambulance). The roll-in cot 10 may comprise a load end sensor 76 communicatively coupled to the one or more processors 100. The load end sensor 76 is a distance sensor operable to detect the location of the front load wheels 70 with respect to a loading surface (e.g., distance from the detected surface to the front load wheels 70). Suitable distance sensors include, but are not limited to, ultrasonic sensors, touch sensors, proximity sensors, or any other sensor capable to detecting distance to an object. In one embodiment, load end sensor 76 is operable to detect directly or indirectly the distance from the front load wheels 70 to a surface substantially directly beneath the front load wheels 70. Specifically, load end sensor 76 can provide an indication when a surface is within a definable range of distance from the front load wheels 70 (e.g., when a surface is greater than a first distance but less than a second distance). Accordingly, the definable range may be set such that a positive indication is provided by load end sensor 76 when the front load wheels 70 of the roll-in cot 10 are in contact with a loading surface. Ensuring that both front load wheels 70 are on the loading surface may be important, especially in circumstances when the roll-in cot 10 is loaded into an ambulance at an incline.

The front legs 20 may comprise intermediate load wheels 30 attached to the front legs 20. In one embodiment, the intermediate load wheels 30 may be disposed on the front legs 20 adjacent the front cross beam 22 (FIG. 1). The roll-in cot 10 may comprise an intermediate load sensor 77 communicatively coupled to the one or more processors 100. The intermediate load sensor 77 is a distance sensor operable to detect the distance between the intermediate load wheels 30 and the loading surface 500. In one embodiment, when the intermediate load wheels 30 are within a set distance of the loading surface, the intermediate load sensor 77 may provide a signal to the one or more processors 100. Although the figures depict the intermediate load wheels 30 only on the front legs 20, it is further contemplated that intermediate load wheels 30 may also be disposed on the back legs 40 or any other position on the roll-in cot 10 such that the intermediate load wheels 30 cooperate with the front load wheels 70 to facilitate loading and/or unloading (e.g., the support frame 12). For example, intermediate load wheels can be provided at any location that is likely to be a fulcrum or center of balance during the loading and/or unloading process described herein.

The roll-in cot 10 may comprise a back actuator sensor 78 communicatively coupled to the one or more processors 100. The back actuator sensor 78 is a distance sensor operable to detect the distance between the back actuator 18 and the loading surface. In one embodiment, back actuator sensor 78 is operable to detect directly or indirectly the distance from the back actuator 18 to a surface substantially directly beneath the back actuator 18, when the back legs 40 are substantially fully retracted (FIGS. 4, 5D, and 5E). Specifically, back actuator sensor 78 can provide an indication when a surface is within a definable range of distance from the back actuator 18 (e.g., when a surface is greater than a first distance but less than a second distance).

Referring still to FIGS. 3 and 7, the roll-in cot 10 may comprise a front drive light 86 communicatively coupled to the one or more processors 100. The front drive light 86 can be coupled to the front actuator 16 and configured to articulate with the front actuator 16. Accordingly, the front drive light 86 can illuminate an area directly in front of the front end 17 of the roll-in cot 10, as the roll-in cot 10 is rolled with the front actuator 16 extended, retracted, or any position there between. The roll-in cot 10 may also comprise a back drive light 88 communicatively coupled to the one or more processors 100. The back drive light 88 can be coupled to the back actuator 18 and configured to articulate with the back actuator 18. Accordingly, the back drive light 88 can illuminate an area directly in behind of the back end 19 of the roll-in cot 10, as the roll-in cot 10 is rolled with the back actuator 18 extended, retracted, or any position there between. The one or more processors 100 can receive input from any of the operator controls described herein and cause the front drive light 86, the back drive light 88, or both to be activated.

Referring collectively to FIGS. 1 and 7, the roll-in cot 10 may comprise a line indicator 74 communicatively coupled to the one or more processors 100. The line indicator 74 can be any light source configured to project a linear indication upon a surface such as, for example, a laser, light emitting diodes, a projector, or the like. In one embodiment, the line indicator 74 can be coupled to the roll-in cot 10 and configured to project a line upon a surface below the roll-in cot 10, such that the line is aligned with the intermediate load wheels 30. The line can run from a point beneath or adjacent to the roll-in cot 10 and to a point offset from the side of the roll-in cot 10. Accordingly, when the line indicator projects the line, an operator at the back end 19 of the can maintain visual contact with the line and utilize the line as a reference of the location of the center of balance of the roll-in cot 10 (e.g., the intermediate load wheels 30) during loading, unloading, or both.

The back end 19 may comprise operator controls for the roll-in cot 10. As used herein, the operator controls comprise the input components that receive commands from the operator and the output components that provide indications to the operator. Accordingly, the operator can utilize the operator controls in the loading and unloading of the roll-in cot 10 by controlling the movement of the front legs 20, the back legs 40, and the support frame 12. The operator controls may include a control box 50 disposed on the back end 19 of the roll-in cot 10. For example, the control box 50 can be communicatively coupled to the one or more processors 100, which is in turn communicatively coupled to the front actuator 16 and the back actuator 18. The control box 50 can comprise a visual display component 58 such as, for example, a liquid crystal display, a touch screen and the like. Accordingly, the control box 50 can receive input, which can be processed by the one or more processors 100 to control the front actuator 16 and back actuator 18. It is noted that, while the embodiments described herein make reference to automated operation of the front actuator 16 and back actuator 18, the embodiments described herein can include operator controls that are configured to directly control front actuator 16 and back actuator 18. That is, the automated processes described herein can be overridden by a user and the front actuator 16 and back actuator 18 can be actuated independent of input from the sensors.

The operator controls may comprise one or more hand controls 57 (for example, buttons on telescoping handles) disposed on the back end 19 of the roll-in cot 10. As an alternative to the hand control embodiment, the control box 50 may also include a component which may be used to raise and lower the roll-in cot 10. In one embodiment, the component is a toggle switch 52, which is able to raise (+) or lower (−) the cot. Other buttons, switches, or knobs are also suitable. Due to the integration of the sensors in the roll-in cot 10, as is explained in greater detail herein, the toggle switch 52 may be used to control the front legs 20 or back legs 40 which are operable to be raised, lowered, retracted or released depending on the position of the roll-in cot 10.

In one embodiment the toggle switch is analog (i.e., the pressure and/or displacement of the analog switch is proportional to the speed of actuation). The operator controls may comprise a visual display component 58 configured to inform an operator whether the front and back actuators 16, 18 are activated or deactivated, and thereby may be raised, lowered, retracted or released. While the operator controls are disposed at the back end 19 of the roll-in cot 10 in the present embodiments, it is further contemplated that the operator controls be positioned at alternative positions on the support frame 12, for example, on the front end 17 or the sides of the support frame 12. In still further embodiments, the operator controls may be located in a removably attachable wireless remote control that may control the roll-in cot 10 without physical attachment to the roll-in cot 10.

Turning now to embodiments of the roll-in cot 10 being simultaneously actuated, the cot of FIG. 2 is depicted as extended, thus front actuator sensor 62 and back actuator sensor 64 detect that the front actuator 16 and the back actuator 18 are under compression, i.e., the front legs 20 and the back legs 40 are in contact with a lower surface and are loaded. The front and back actuators 16 and 18 are both active when the front and back actuator sensors 62, 64 detect both the front and back actuators 16, 18, respectively, are under compression and can be raised or lowered by the operator using the operator controls (e.g., "−" to lower and "+" to raise).

Figure 4A:
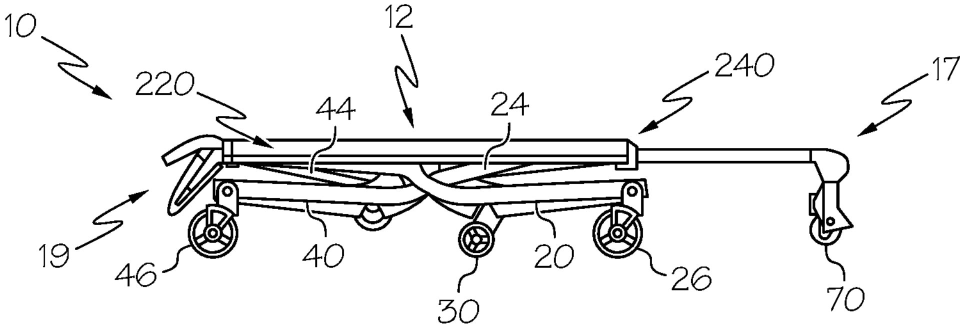
FIGS. 4A-4C is a side view depicting a raising and/or lowering sequence of a cot according to one or more embodiments described herein.
Figure 4B:
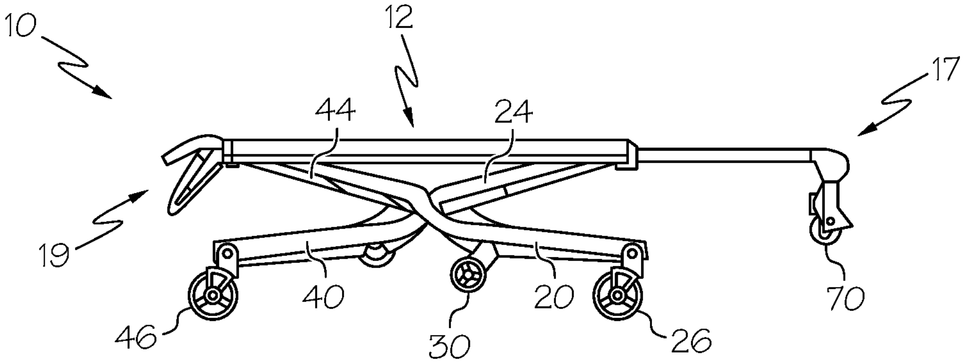
Figure 4C:
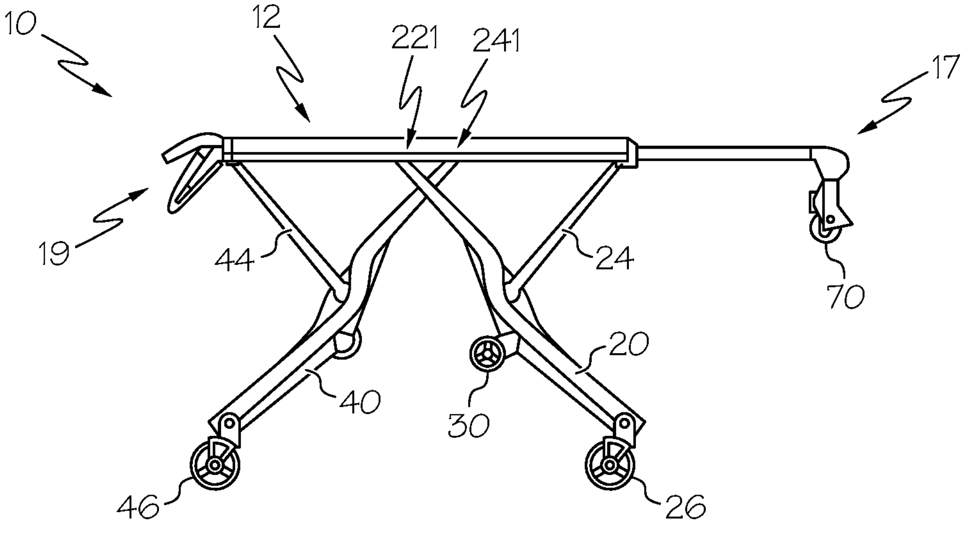
Figure 5D:
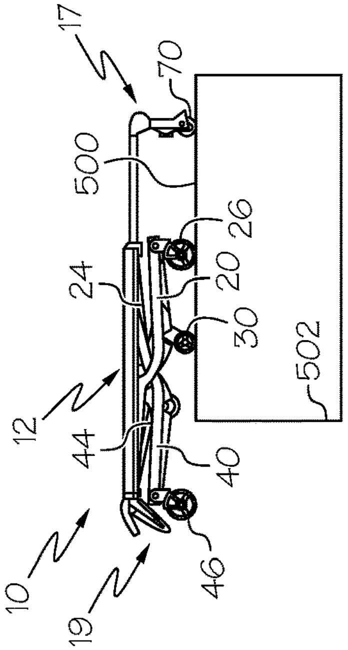
FIGS. 5A-5E is a side view depicting a loading and/or unloading sequence of a cot according to one or more embodiments described herein.
Figure 5E:
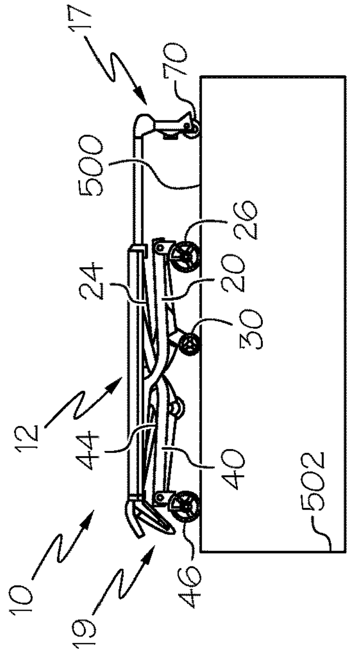

Referring collectively to FIGS. 4A-4C, an embodiment of the roll-in cot 10 being raised (FIGS. 4A-4C) or lowered (FIGS. 4C-4A) via simultaneous actuation is schematically depicted (note that for clarity the front actuator 16 and the back actuator 18 are not depicted in FIGS. 4A-4C). In the depicted embodiment, the roll-in cot 10 comprises a support frame 12 slidingly engaged with a pair of front legs 20 and a pair of back legs 40. Each of the front legs 20 are rotatably coupled to a front hinge member 24 that is rotatably coupled to the support frame 12. Each of the back legs 40 are rotatably coupled to a back hinge member 44 that is rotatably coupled to the support frame 12. In the depicted embodiment, the front hinge members 24 are rotatably coupled towards the front end 17 of the support frame 12 and the back hinge members 44 that are rotatably coupled to the support frame 12 towards the back end 19.

FIG. 4A depicts the roll-in cot 10 in a lowest transport position. Specifically, the back wheels 46 and the front wheels 26 are in contact with a surface, the front leg 20 is slidingly engaged with the support frame 12 such that the front leg 20 contacts a portion of the support frame 12 towards the back end 19 and the back leg 40 is slidingly engaged with the support frame 12 such that the back leg 40 contacts a portion of the support frame 12 towards the front end 17. FIG. 4B depicts the roll-in cot 10 in an intermediate transport position, i.e., the front legs 20 and the back legs 40 are in intermediate transport positions along the support frame 12. FIG. 4C depicts the roll-in cot 10 in a highest transport position, i.e., the front legs 20 and the back legs 40 positioned along the support frame 12 such that the front load wheels 70 are at a maximum desired height which can be set to height sufficient to load the cot, as is described in greater detail herein.

The embodiments described herein may be utilized to lift a patient from a position below a vehicle in preparation for loading a patient into the vehicle (e.g., from the ground to above a loading surface of an ambulance). Specifically, the roll-in cot 10 may be raised from the lowest transport position (FIG. 4A) to an intermediate transport position (FIG. 4B) or the highest transport position (FIG. 4C) by simultaneously actuating the front legs 20 and back legs 40 and causing them to slide along the support frame 12. When being raised, the actuation causes the front legs to slide towards the front end 17 and to rotate about the front hinge members 24, and the back legs 40 to slide towards the back end 19 and to rotate about the back hinge members 44. Specifically, a user may interact with a control box 50 (FIG. 2) and provide input indicative of a desire to raise the roll-in cot 10 (e.g., by pressing "+" on toggle switch 52). The roll-in cot 10 is raised from its current position (e.g., lowest transport position or an intermediate transport position) until it reaches the highest transport position. Upon reaching the highest transport position, the actuation may cease automatically, i.e., to raise the roll-in cot 10 higher additional input is required. Input may be provided to the roll-in cot 10 and/or control box 50 in any manner such as electronically, audibly or manually.

The roll-in cot 10 may be lowered from an intermediate transport position (FIG. 4B) or the highest transport position (FIG. 4C) to the lowest transport position (FIG. 4A) by simultaneously actuating the front legs 20 and back legs 40 and causing them to slide along the support frame 12. Specifically, when being lowered, the actuation causes the front legs to slide towards the back end 19 and to rotate about the front hinge members 24, and the back legs 40 to slide towards the front end 17 and to rotate about the back hinge members 44. For example, a user may provide input indicative of a desire to lower the roll-in cot 10 (e.g., by pressing a "−" on toggle switch 52). Upon receiving the input, the roll-in cot 10 lowers from its current position (e.g., highest transport position or an intermediate transport position) until it reaches the lowest transport position. Once the roll-in cot 10 reaches its lowest height (e.g., the lowest transport position) the actuation may cease automatically. In some embodiments, the control box 50 provides a visual indication that the front legs 20 and back legs 40 are active during movement.

In one embodiment, when the roll-in cot 10 is in the highest transport position (FIG. 4C), the front legs 20 are in contact with the support frame 12 at a front-loading index 221 and the back legs 40 are in contact with the support frame 12 a back-loading index 241. While the front-loading index 221 and the back-loading index 241 are depicted in FIG. 4C as being located near the middle of the support frame 12, additional embodiments are contemplated with the front-loading index 221 and the back-loading index 241 located at any position along the support frame 12. Some embodiments can have a load position that is higher than the highest transport position. For example, the highest load position may be set by actuating the roll-in cot 10 to the desired height and providing input indicative of a desire to set the highest load position (e.g., pressing and holding the "+" and "−" on toggle switch 52 simultaneously for 10 seconds).

In another embodiment, any time the roll-in cot 10 is raised over the highest transport position for a set period of time (e.g., 30 seconds), the control box 50 provides an indication that the roll-in cot 10 has exceeded the highest transport position and the roll-in cot 10 needs to be lowered. The indication may be visual, audible, electronic or combinations thereof.

When the roll-in cot 10 is in the lowest transport position (FIG. 4A), the front legs 20 may be in contact with the support frame 12 at a front-flat index 220 located near the back end 19 of the support frame 12 and the back legs 40 may be in contact with the support frame 12 a back-flat index 240 located near the front end 17 of the support frame 12. Furthermore, it is noted that the term "index," as used herein means a position along the support frame 12 that corresponds to a mechanical stop or an electrical stop such as, for example, an obstruction in a channel formed in a lateral side member 15, a locking mechanism, or a stop controlled by a servomechanism.

The front actuator 16 is operable to raise or lower a front end 17 of the support frame 12 independently of the back actuator 18. The back actuator 18 is operable to raise or lower a back end 19 of the support frame 12 independently of the front actuator 16. By raising the front end 17 or back end 19 independently, the roll-in cot 10 is able to maintain the support frame 12 level or substantially level when the roll-in cot 10 is moved over uneven surfaces, for example, a staircase or hill. Specifically, if one of the front legs 20 or the back legs 40 is in tension, the set of legs not in contact with a surface (i.e., the set of legs that is in tension) is activated by the roll-in cot 10 (e.g., moving the roll-in cot 10 off of a curb). Further embodiments of the roll-in cot 10 are operable to be automatically leveled. For example, if back end 19 is lower than the front end 17, pressing the "+" on toggle switch 52 raises the back end 19 to level prior to raising the roll-in cot 10, and pressing the "−" on toggle switch 52 lowers the front end 17 to level prior to lowering the roll-in cot 10.

Referring collectively to FIGS. 4C-5E, independent actuation may be utilized by the embodiments described herein for loading a patient into a vehicle (note that for clarity the front actuator 16 and the back actuator 18 are not depicted in FIGS. 4C-5E). Specifically, the roll-in cot 10 can be loaded onto a loading surface 500 according the process described below. First, the roll-in cot 10 may be placed into the highest load position or any position where the front load wheels 70 are located at a height greater than the loading surface 500. When the roll-in cot 10 is loaded onto a loading surface 500, the roll-in cot 10 may be raised via front and back actuators 16 and 18 to ensure the front load wheels 70 are disposed over a loading surface 500. In some embodiments, the front actuator 16 and the back actuator 18 can be actuated contemporaneously to keep the roll-in cot level until the height of the roll-in cot is at a predetermined position. Once the predetermined height is reached, the front actuator 16 can raise the front end 17 such that the roll-in cot 10 is angled at its highest load position. Accordingly, the roll-in cot 10 can be loaded with the back end 19 lower than the front end 17. Then, the roll-in cot 10 may be lowered until front load wheels 70 contact the loading surface 500 (FIG. 5A).

Figure 5C:
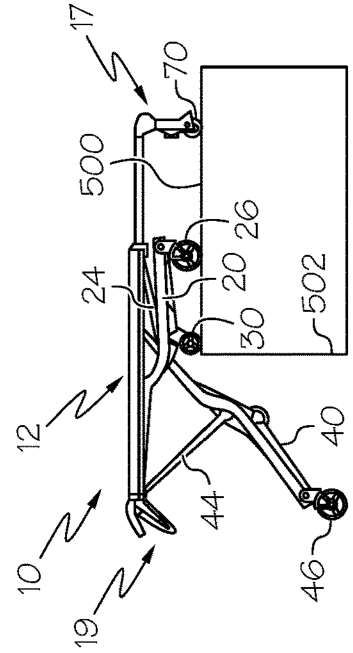
Figure 5A:
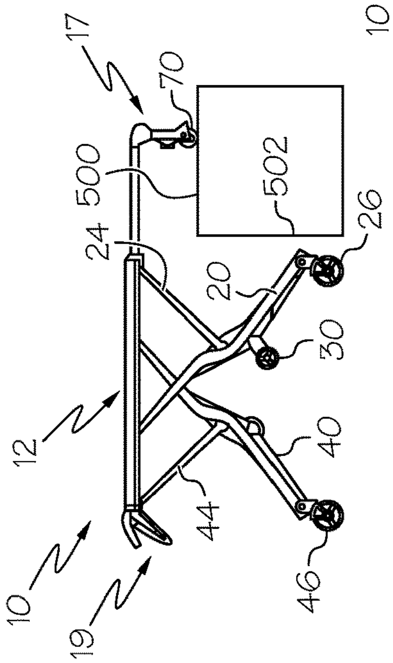
Figure 5B:
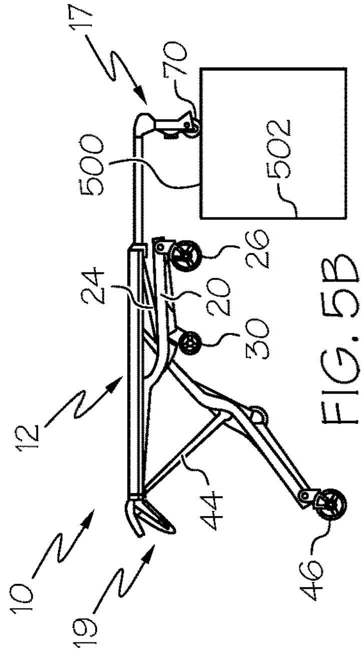

As is depicted in FIG. 5A, the front load wheels 70 are over the loading surface 500. In one embodiment, after the load wheels contact the loading surface 500 the pair of front legs 20 can be actuated with the front actuator 16 because the front end 17 is above the loading surface 500. As depicted in FIGS. 5A and 5B, the middle portion of the roll-in cot 10 is away from the loading surface 500 (i.e., a large enough portion of the roll-in cot 10 has not been loaded beyond the loading edge 502 such that most of the weight of the roll-in cot 10 can be cantilevered and supported by the wheels 70, 26, and/or 30). When the front load wheels 70 are sufficiently loaded, the roll-in cot 10 may be held level with a reduced amount of force. Additionally, in such a position, the front actuator 16 is in tension and the back actuator 18 is in compression. Thus, for example, if the "−" on toggle switch 52 is activated, the front legs 20 are raised (FIG. 5B).

In one embodiment, after the front legs 20 have been raised enough to trigger a loading state, the operation of the front actuator 16 and the back actuator 18 is dependent upon the location of the roll-in cot. In some embodiments, upon the front legs 20 raising, a visual indication is provided on the visual display component 58 of the control box 50 (FIG. 2). The visual indication may be color-coded (e.g., activated legs in green and non-activated legs in red). The front actuator 16 may automatically cease to operate when the front legs 20 have been fully retracted. Furthermore, it is noted that during the retraction of the front legs 20, the front actuator sensor 62 may detect tension, at which point, front actuator 16 may raise the front legs 20 at a higher rate, for example, fully retract within about 2 seconds.

Referring collectively to FIGS. 3, 5B, and 7, the back actuator 18 can be automatically actuated by the one or more processors 100 after the front load wheels 70 have been loaded upon the loading surface 500 to assist in the loading of the roll-in cot 10 onto the loading surface 500. Specifically, when the front angular sensor 66 detects that the front angle $\alpha_f$ is less than a predetermined angle, the one or more processors 100 can automatically actuate the back actuator 18 to extend the back legs 40 and raise the back end 19 of the roll-in cot 10 higher than the original loading height. The predetermined angle can be any angle indicative of a loading state or a percentage of extension such as, for example, less than about 10% extension of the front legs 20 in one embodiment, or less than about 5% extension of the front legs 20 in another embodiment. In some embodiments, the one or more processors 100 can determine if the load end sensor 76 indicates that the front load wheels 70 are touching the loading surface 500 prior to automatically actuating the back actuator 18 to extend the back legs 40.

In further embodiments, the one or more processors 100 can monitor the back angular sensor 68 to verify that the back angle $\alpha_b$ is changing in accordance to the actuation of the back actuator 18. In order to protect the back actuator 18, the one or more processors 100 can automatically abort the actuation of the back actuator 18 if the back angle $\alpha_b$ is indicative of improper operation. For example, if the back angle $\alpha_b$ fails to change for a predetermined amount of time (e.g., about 200 ms), the one or more processors 100 can automatically abort the actuation of the back actuator 18.

Referring collectively to FIGS. 5A-5E, after the front legs 20 have been retracted, the roll-in cot 10 may be urged forward until the intermediate load wheels 30 have been loaded onto the loading surface 500 (FIG. 5C). As depicted in FIG. 5C, the front end 17 and the middle portion of the roll-in cot 10 are above the loading surface 500. As a result, the pair of back legs 40 can be retracted with the back actuator 18. Specifically, the intermediate load sensor 77 can detect when the middle portion is above the loading surface 500. When the middle portion is above the loading surface 500 during a loading state (e.g., the front legs 20 and back legs 40 have an angle delta greater than the loading state angle), the back actuator may be actuated. In one embodiment, an indication may be provided by the control box 50 (FIG. 2) when the intermediate load wheels 30 are sufficiently beyond the loading edge 502 to allow for back leg 40 actuation (e.g., an audible beep may be provided).

It is noted that, the middle portion of the roll-in cot 10 is above the loading surface 500 when any portion of the roll-in cot 10 that may act as a fulcrum is sufficiently beyond the loading edge 502 such that the back legs 40 may be retracted with a reduced amount of force is required to lift the back end 19 (e.g., less than half of the weight of the roll-in cot 10, which may be loaded, needs to be supported at the back end 19). Furthermore, it is noted that the detection of the location of the roll-in cot 10 may be accomplished by sensors located on the roll-in cot 10 and/or sensors on or adjacent to the loading surface 500. For example, an ambulance may have sensors that detect the positioning of the roll-in cot 10 with respect to the loading surface 500 and/or loading edge 502 and communications means to transmit the information to the roll-in cot 10.

Referring to FIG. 5D, after the back legs 40 are retracted and the roll-in cot 10 may be urged forward. In one embodiment, during the back leg retraction, the back actuator sensor 64 may detect that the back legs 40 are unloaded, at which point, the back actuator 18 may raise the back legs 40 at higher speed. Upon the back legs 40 being fully retracted, the back actuator 18 may automatically cease to operate. In one embodiment, an indication may be provided by the control box 50 (FIG. 2) when the roll-in cot 10 is sufficiently beyond the loading edge 502 (e.g., fully loaded or loaded such that the back actuator is beyond the loading edge 502).

Once the cot is loaded onto the loading surface (FIG. 5E), the front and back actuators 16, 18 may be deactivated by being lockingly coupled to an ambulance. The ambulance and the roll-in cot 10 may each be fitted with components suitable for coupling, for example, male-female connectors. Additionally, the roll-in cot 10 may comprise a sensor which registers when the cot is fully disposed in the ambulance, and sends a signal which results in the locking of the actuators 16, 18. In yet another embodiment, the roll-in cot 10 may be connected to a cot fastener, which locks the actuators 16, 18, and is further coupled to the ambulance's power system, which charges the roll-in cot 10. A commercial example of such ambulance charging systems is the Integrated Charging System (ICS) produced by Ferno-Washington, Inc.

Referring collectively to FIGS. 5A-5E, independent actuation, as is described above, may be utilized by the embodiments described herein for unloading the roll-in cot 10 from a loading surface 500. Specifically, the roll-in cot 10 may be unlocked from the fastener and urged towards the loading edge 502 (FIG. 5E to FIG. 5D). As the back wheels 46 are released from the loading surface 500 (FIG. 5D), the back actuator sensor 64 detects that the back legs 40 are unloaded and allows the back legs 40 to be lowered. In some embodiments, the back legs 40 may be prevented from lowering, for example if sensors detect that the cot is not in the correct location (e.g., the back wheels 46 are above the loading surface 500 or the intermediate load wheels 30 are away from the loading edge 502). In one embodiment, an indication may be provided by the control box 50 (FIG. 2) when the back actuator 18 is activated (e.g., the intermediate load wheels 30 are near the loading edge 502 and/or the back actuator sensor 64 detects tension).

Referring collectively to FIGS. 5D and 7, the line indicator 74 can be automatically actuated by the one or more processors to project a line upon the loading surface 500 indicative of the center of balance of the roll-in cot 10. In one embodiment, the one or more processors 100 can receive input from the intermediate load sensor 77 indicative of the intermediate load wheels 30 being in contact with the loading surface. The one or more processors 100 can also receive input from the back actuator sensor 64 indicative of back actuator 18 being in tension. When the intermediate load wheels 30 are in contact with the loading surface and the back actuator 18 is in tension, the one or more processors can automatically cause the line indicator 74 to project the line. Accordingly, when the line is projected, an operator can be provided with a visual indication on the load surface that can be utilized as a reference for loading, unloading, or both. Specifically, the operator can slow the removal of the roll-in cot 10 from the loading surface 500 as the line approaches the loading edge 502, which can allow additional time for the back legs 40 to be lowered. Such operation can minimize the amount of time that the operator will be required to support the weight of the roll-in cot 10.

Referring collectively to FIGS. 5A-5E, when the roll-in cot 10 is properly positioned with respect to the loading edge 502, the back legs 40 can be extended (FIG. 5C). For example, the back legs 40 may be extended by pressing the "+" on toggle switch 52. In one embodiment, upon the back legs 40 lowering, a visual indication is provided on the visual display component 58 of the control box 50 (FIG. 2). For example, a visual indication may be provided when the roll-in cot 10 is in a loading state and the back legs 40 and/or front legs 20 are actuated. Such a visual indication may signal that the roll-in cot should not be moved (e.g., pulled, pushed, or rolled) during the actuation. When the back legs 40 contact the floor (FIG. 5C), the back legs 40 become loaded and the back actuator sensor 64 deactivates the back actuator 18.

When a sensor detects that the front legs 20 are clear of the loading surface 500 (FIG. 5B), the front actuator 16 is activated. In one embodiment, when the intermediate load wheels 30 are at the loading edge 502 an indication may be provided by the control box 50 (FIG. 2). The front legs 20 are extended until the front legs 20 contact the floor (FIG. 5A). For example, the front legs 20 may be extended by pressing the "+" on toggle switch 52. In one embodiment, upon the front legs 20 lowering, a visual indication is provided on the visual display component 58 of the control box 50 (FIG. 2).

It should now be understood that the embodiments described herein may be utilized to transport patients of various sizes by coupling a support surface such as a patient support surface to the support frame. For example, a lift-off stretcher or an incubator may be removably coupled to the support frame. Therefore, the embodiments described herein may be utilized to load and transport patients ranging from infants to bariatric patients. Furthermore the embodiments described herein, may be loaded onto and/or unloaded from an ambulance by an operator holding a single button to actuate the independently articulating legs (e.g., pressing the "–" on the toggle switch to load the cot onto an ambulance or pressing the "+" on the toggle switch to unload the cot from an ambulance). Specifically, the roll-in cot 10 may receive an input signal such as from the operator controls. The input signal may be indicative a first direction or a second direction (lower or raise). The pair of front legs and the pair of back legs may be lowered independently when the signal is indicative of the first direction or may be raised independently when the signal is indicative of the second direction.

It is further noted that terms like "preferably," "generally," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having provided reference to specific embodiments, it will be apparent that modifications and variations are possible without departing from the scope of the present disclosure defined in the appended claims. More specifically, although some aspects of the present disclosure are identified herein as preferred or particularly advantageous, it is contemplated that the present disclosure is not necessarily limited to these preferred aspects of any specific embodiment.

What is claimed is:

1. A method of automatically articulating a powered ambulance cot to load a patient into an emergency vehicle having a loading surface, the method comprising:

configuring the powered ambulance cot to comprise:

a support frame provided with a pair of front load wheels;

a pair of front legs each having a front wheel and an intermediate load wheel;

a pair of back legs each having a back wheel;

a cot actuation system; and a cot control system which detects a presence of a signal requesting a change in elevation of the support frame and which is operably connected to the cot actuation system to control raising and lowering of the pair of front legs and the pair of back legs relative to the support frame;

raising the support frame with the cot actuation system to a height which places the front load wheels above the loading surface of the emergency vehicle in response to the cot control system detecting presence of a signal requesting the support frame be raised;

rolling the powered ambulance cot towards the emergency vehicle until the front load wheels are over the loading surface;

lowering the support frame with the cot actuation system until the front load wheels contact the loading surface in response to the cot control system detecting the presence of a signal requesting the support frame be lowered;

automatically raising the pair of front legs relative to the support frame with the cot actuation system until the front wheel of each of the pair of front legs is at or above the loading surface in response to the cot control system detecting both (a) a signal requesting the pair of front legs be raised and (b) the front load wheels being in contact with the loading surface;

rolling the powered ambulance cot farther onto the loading surface;

raising the pair of back legs relative to the support frame with the cot actuation system until the back wheels are at or above the loading surface in response to the cot control system detecting presence of a signal requesting the pair of back legs be raised; and rolling the powered ambulance cot farther onto the loading surface.

2. The method according to claim 1, wherein the cot control system activates the cot actuation system to raise the pair of front legs relative to the support frame upon detecting the front load wheels contacting the loading surface in addition to detecting the presence of the signal requesting the front legs be raised.

3. The method according to claim 1, wherein the cot control system activates the cot actuation system to raise the pair of back legs relative to the support frame upon detecting the intermediate load wheels contacting the loading surface in addition to detecting the presence of the signal requesting the back legs be raised.

4. The method according to claim 1, wherein the cot actuation system comprises a front actuator and a back actuator both of which are actuated contemporaneously to keep the cot level relative to gravity when raising the support frame of the powered ambulance cot to the height which places the front load wheels above the loading surface of the emergency vehicle in response to the cot control system detecting the presence of the signal requesting the support frame be raised and activating the cot actuation system.

5. The method according to claim 4, wherein the height is predetermined, and once the predetermined height is reached, the front actuator is further actuated by the cot control system to raise a front end of the cot.

6. The method according to claim 5, wherein the cot control system activates the cot actuation system to extend the pair of back legs relative to the support frame upon detecting the front load wheels contacting the loading surface in addition to detecting the presence of the signal requesting the front legs be raised.

7. The method according to claim 1, wherein the cot actuation system comprises:

a front actuator which moves together the pair of front legs and which interconnects the support frame and the pair of front legs; and a back actuator which moves together the pair of back legs and which interconnects the support frame and the pair of back legs.

8. The method of claim 1, wherein rolling the powered ambulance cot farther onto the loading surface continues until the intermediate load wheel of each of the pair of front legs is on the loading surface.

9. The method of claim 8, wherein rolling the powered ambulance cot farther onto the loading surface continues until the back wheel of each of the pair of back legs is on the loading surface.

* * * * *